US012281966B2

(12) United States Patent
Esteve (10) Patent No.: US 12,281,966 B2
(45) Date of Patent: Apr. 22, 2025

(54) DISPENSER HEAD AND DISPENSER FOR DISPENSING UNITS OF A PHARMACEUTICAL DRUG OR A FOOD SUPPLEMENT OR FOOD

(71) Applicant: EMPHASYS IMPORTADORA EXPORTADORA E DISTRIBUIDORA LTDA., Porto Feliz SP (BR)

(72) Inventor: Victor Esteve, Itu (BR)

(73) Assignee: Emphasys Importadora Exportadora e Distribuidora Ltda., Porto Feliz SP (BR)

( * ) Notice: Subject to any disclaimer, the term of this patent is extended or adjusted under 35 U.S.C. 154(b) by 178 days.

(21) Appl. No.: 17/801,369

(22) PCT Filed: Nov. 12, 2020

(86) PCT No.: PCT/IB2020/000872
§ 371 (c)(1),
(2) Date: Aug. 22, 2022

(87) PCT Pub. No.: WO2021/198724
PCT Pub. Date: Oct. 7, 2021

(65) Prior Publication Data
US 2023/0079268 A1 Mar. 16, 2023

(30) Foreign Application Priority Data
Mar. 30, 2020 (DE) .......................... 102020108729.2

(51) Int. Cl.
B65D 83/04 (2006.01)
B29C 48/00 (2019.01)
(Continued)

(52) U.S. Cl.
CPC .......... *G01M 3/3263* (2013.01); *B29C 48/00* (2019.02); *B29C 49/00* (2013.01);
(Continued)

(58) Field of Classification Search
CPC . B29C 49/58; B29C 2949/3016; B29C 48/00; B29C 49/00; B29C 49/4273;
(Continued)

(56) References Cited

U.S. PATENT DOCUMENTS 3,734,283 A * 5/1973 Simmons ........... B65D 83/0481
206/445
5,383,559 A 1/1995 Toren
(Continued)

FOREIGN PATENT DOCUMENTS

CN 110228666 A 9/2019
DE 1922969 U 9/1965
(Continued)

OTHER PUBLICATIONS

International Search Report for application No. PCT/I B2020/000872 dated Jan. 18, 2021.
(Continued)

*Primary Examiner* — Donnell A Long
(74) *Attorney, Agent, or Firm* — Carter, DeLuca & Farrell LLP (57) ABSTRACT

A dispenser head for dispensing a unit of a pharmaceutical drug or a food supplement or food includes a dosing duct for extending along a dosing axis and connecting an inlet port for receiving the unit from a reservoir with an outlet port for dispensing the unit. The dispenser head includes a support section for the unit, which extends from the outlet port parallel to the dosing axis. The dispenser head also includes a retention section, which extends from the support section.

24 Claims, 13 Drawing Sheets

(51) Int. Cl.
| | |
|---|---|
| *B29C 49/00* | (2006.01) |
| *B29C 49/42* | (2006.01) |
| *B29C 49/80* | (2006.01) |
| *B65D 1/02* | (2006.01) |
| *B65D 23/02* | (2006.01) |
| *G01M 3/32* | (2006.01) |
| *G01M 99/00* | (2011.01) |
| *B29C 49/04* | (2006.01) |
| *B29C 49/22* | (2006.01) |
| *B29C 49/78* | (2006.01) |
| *B29L 9/00* | (2006.01) |
| *B29L 31/00* | (2006.01) |

(52) U.S. Cl.
CPC .......... *B29C 49/4273* (2013.01); *B29C 49/80* (2013.01); *B65D 1/0215* (2013.01); *B65D 23/02* (2013.01); *B65D 83/0427* (2013.01); *B65D 83/0481* (2013.01); *G01M 3/3218* (2013.01); *G01M 3/3236* (2013.01); *G01M 3/3281* (2013.01); *G01M 99/00* (2013.01); *B29C 49/04* (2013.01); *B29C 49/22* (2013.01); *B29C 49/78* (2013.01); *B29L 2009/001* (2013.01); *B29L 2031/7128* (2013.01); *B65D 2205/00* (2013.01)

(58) Field of Classification Search
CPC ........ B29C 49/80; B29C 49/04; B29C 49/22; B29C 49/78; B29C 2949/3094; G01M 3/3263; G01M 3/3218; G01M 3/3236; G01M 3/3281; G01M 99/00; B65D 1/0215; B65D 23/02; B65D 83/0427; B65D 83/0481; B65D 2205/00; B29L 2009/001; B29L 2031/7128

See application file for complete search history.

(56) References Cited

U.S. PATENT DOCUMENTS

| | | | |
|---|---|---|---|
| 5,971,154 A | 10/1999 | Toren | |
| 2004/0045978 A1* | 3/2004 | Peng | B65D 83/0427 221/312 R |
| 2004/0182877 A1 | 9/2004 | Oroumieh | |
| 2009/0223994 A1* | 9/2009 | Getz | B65D 83/0427 221/154 |
| 2012/0103985 A1* | 5/2012 | Dwork | B65D 47/0866 220/254.1 |
| 2020/0039729 A1 | 2/2020 | Martin et al. | |

FOREIGN PATENT DOCUMENTS

| | | |
|---|---|---|
| DE | 2921186 A1 | 11/1980 |
| DE | 102004049349 A1 | 4/2006 |
| EP | 0045241 A1 | 2/1982 |
| WO | 2007071837 A2 | 6/2007 |
| WO | 2017164885 A1 | 9/2017 |

OTHER PUBLICATIONS

Written Opinion for application No. PCT/IB2020/000872 dated Oct. 7, 2021.
Search Report of priority application dated Mar. 30, 2020.
Korean Office Action for application No. 10-2022-7031260 dated Jul. 22, 2024 with English translation, 23 pages.

* cited by examiner

DISPENSER HEAD AND DISPENSER FOR DISPENSING UNITS OF A PHARMACEUTICAL DRUG OR A FOOD SUPPLEMENT OR FOOD

The description is related to dispensers for dispensing units of a pharmaceutical drug or a food supplement or food.

The problems of the prior art are resolved by a dispenser head according to claim 1 and by a dispenser according to another independent claim. Further advantageous features are recited in the further claims, in the following description and in the figures.

According to a first aspect of the description, a dispenser head for dispensing a unit, in particular in form of capsules or tablets, of a pharmaceutical drug or a food supplement or food is provided. Said dispenser head comprises: a dosing duct extending along a dosing axis and connecting an inlet port for receiving the unit from a reservoir with an outlet port for dispensing the unit; a support section for the unit, which extends from the exit port parallel to the dosing axis; and a retention section, which extends from the support section.

The dispenser head allows the dispensing of a single unit that can be picked up by the user. The dispenser head can only dispense another individual unit after the aforementioned individual unit has been removed.

Advantageously, the support section supports the unit being provided via the exit port. The retention section stops the movement of the unit moving along the dosing axis and being supported by the support section. Then the user can collect the unit with his/her fingers. Advantageously, the retention section limits the removal of the unit along the dosing axis. The user will be provided with only one single unit at a time and is able to remove this single unit from the dispenser head avoiding unwanted contact with the capsules or tables inside the recipient/reservoir. Moreover, a plurality of units being kept in the container or reservoir are protected from being touched by the user. Therefore, the remaining plurality of units are protected from contamination.

Therefore, the dispenser head resolves dosing and contamination issues being associated with existing bottles and recipients.

Examples of a unit of a pharmaceutical drug comprise a capsule with an outer shell enclosing the pharmaceutical drug, a pill and tablet, each comprising the pharmaceutical drug, and the like.

Examples of food or food supplement comprise candies, sweeteners, sugar globules and the like.

According to an advantageous example, the exit port is delimited by a cutout opening towards the retention section and opening facing away from the support section.

Advantageously, the cutout allows to lift a distal part of the unit upward, so that the unit is not blocked by the retention section, and to remove the unit from the support section.

According to an advantageous example, two parallel walls that extend from the support section delimit the exit port.

Advantageously, the unit, in particular a capsule, is not able to escape to the side.

According to an advantageous example, the retention section comprises a recess facing the exit port.

The recess holds the unit after partly exiting the exit port. Together with the exit port and the support section, the recess maintains the capsule in its removal position.

According to an advantageous example, the support section comprises a recess facing the dosing axis.

Advantageously, the recess of the support section receives the unit and prevents an unwanted dropping of the unit.

According to an advantageous example, the support section tapers towards the retention section.

The resulting lateral cutouts of the support section allow the user's fingers to grab the lateral side of the unit.

According to an advantageous example, the dispenser head comprises an enclosing body; and a dosing body, which is arranged inside the enclosing body movably along an axis between a retracted position and a pick-up position, wherein the dosing body comprises the dosing duct, the support section, and the retention section.

Advantageously, gravity and/or additional force by the user cause the movement of the dosing body into the retracted or pick-up position. By retracting the dosing body, the pick-up section is retracted. Advantageously, this retraction movement decouples sealing from the pick-up issue.

According to an advantageous example, the enclosing body comprises a distal opening through which the support section and the retention section extend, if the dosing body is in its pick-up position.

Advantageously, the pick-up section passes through the distal opening of the enclosing body, when the dosing body is moved into the pick-up position According to another advantageous example, the dispenser head comprises a lid with a closure section configured to close the distal opening.

Therefore, the dispenser can be sealed in order to avoid unwanted moisture entry.

According to an advantageous example, the dispenser head comprises an auxiliary weight body, which is movably attached to the dosing body.

Advantageously, the auxiliary weight body helps to reduce the weight of the dosing body itself on the one hand but increases the overall weight of the movable body.

According to an advantageous example, the auxiliary weight body comprises a desiccant.

Advantageously, the desiccant is integrated into the dispenser head. A loose desiccant bullet inside the reservoir can be avoided.

According to another aspect of the description, a dispenser for dispensing a unit of a pharmaceutical drug or a food supplement or food is provided, wherein the dispenser comprises the dispenser head according to the first aspect, and the reservoir for storing the plurality of units.

FIGS. 1 to 4 refer to a first example of a dispenser head 400 for a dispenser 40 and for dispensing a unit of a pharmaceutical drug or a food supplement or food. The dispenser 40 comprises the dispenser head 400 and the reservoir 41.

A dosing duct 402 of a dosing body 452 extends along a dosing axis 404 and connects an inlet port 406 for receiving the unit C from the reservoir 41 with an outlet port 408 for dispensing the unit C. A support section 430 of the dosing body 452 for the unit C extends from the exit port 408 parallel to the dosing axis 404. A retention section 410 of the dosing body 452 extends from a distal end of the support section 430 at least partly perpendicularly to the dosing axis 404, wherein the retention section 410 is arranged distally to the outlet port 408, and wherein said retention section 410 extends into an imaginary continuation 412 of the dosing duct 402.

The exit port 408 is delimited by a concave cutout 432 opening towards the retention section 410. The concave cutout 432 opens facing away from the support section 430. Two parallel walls 602, 604, which that extend from the support section 430, delimit the exit port 408.

The single retention section 410 is arranged distally to the outlet port 408. The retention section 410 extends into an imaginary continuation 412 of the dosing duct 402. The support section 430 for supporting the pharmaceutical unit extends from the exit port 408 parallel to the dosing axis 404. The retention section 410 is arranged at a distal end of the support section 430. The retention section 410 extends into the imaginary continuation 412.

The retention section 410 comprises a recess 434, which faces the exit port 408. The recess 434 follows partly an imaginary sphere. The support section 430 comprises a recess 436 facing the dosing axis 404. The recess 436 follows partly a cylindrical wall of an imaginary cylinder with the dosing axis 404 as the cylinder axis. The recess 434 and the recess 436 are formed to accommodate the unit C in form of an elongated capsule. The recess 434 and the recess 436 enhance the retention of the unit c in order to avoid its unwanted detachment or falling out depending on the way the user opens/handles the dispenser.

Figure 1:
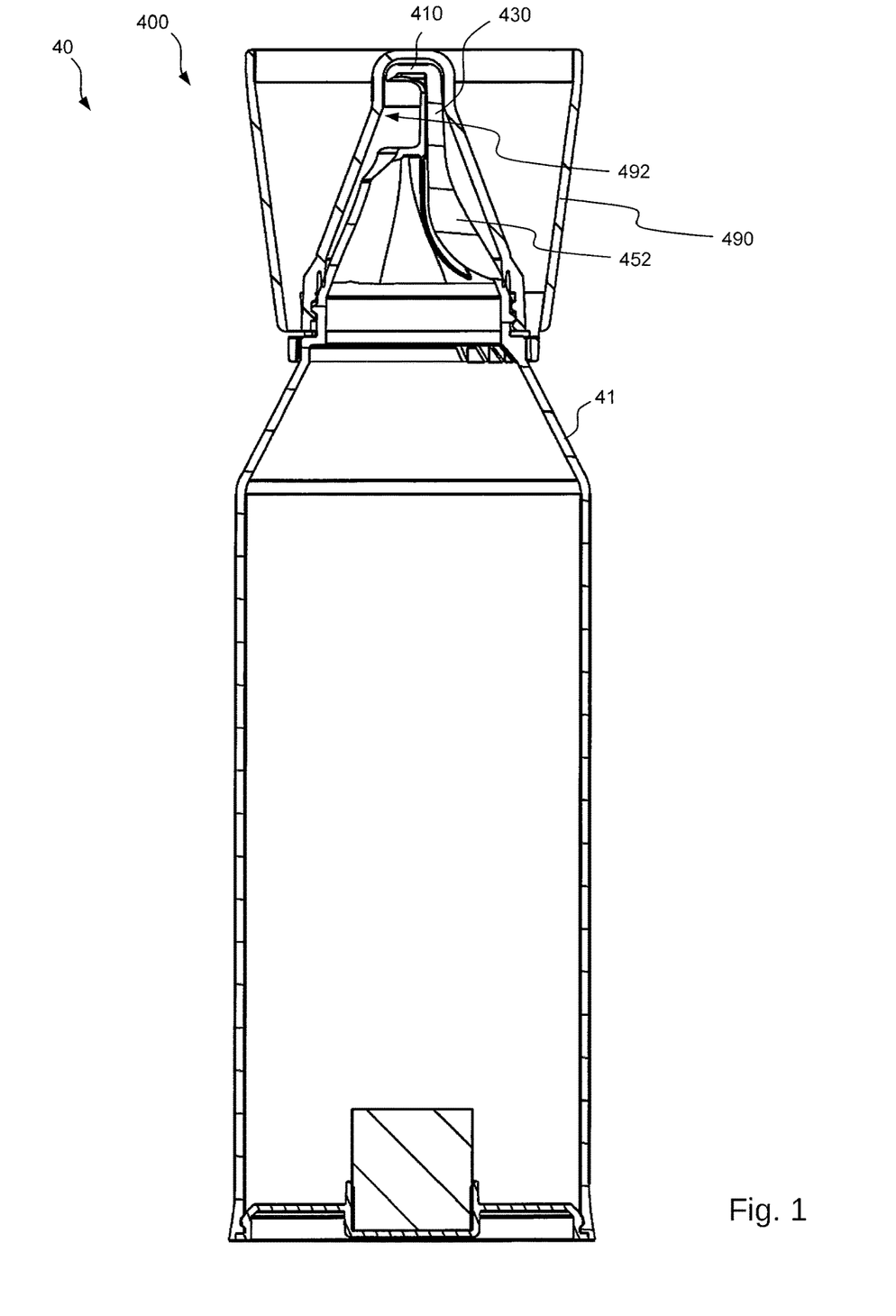
FIGS. 1, 5, and 10 each depict an example of a dispenser for dispensing single units.
Figure 2:
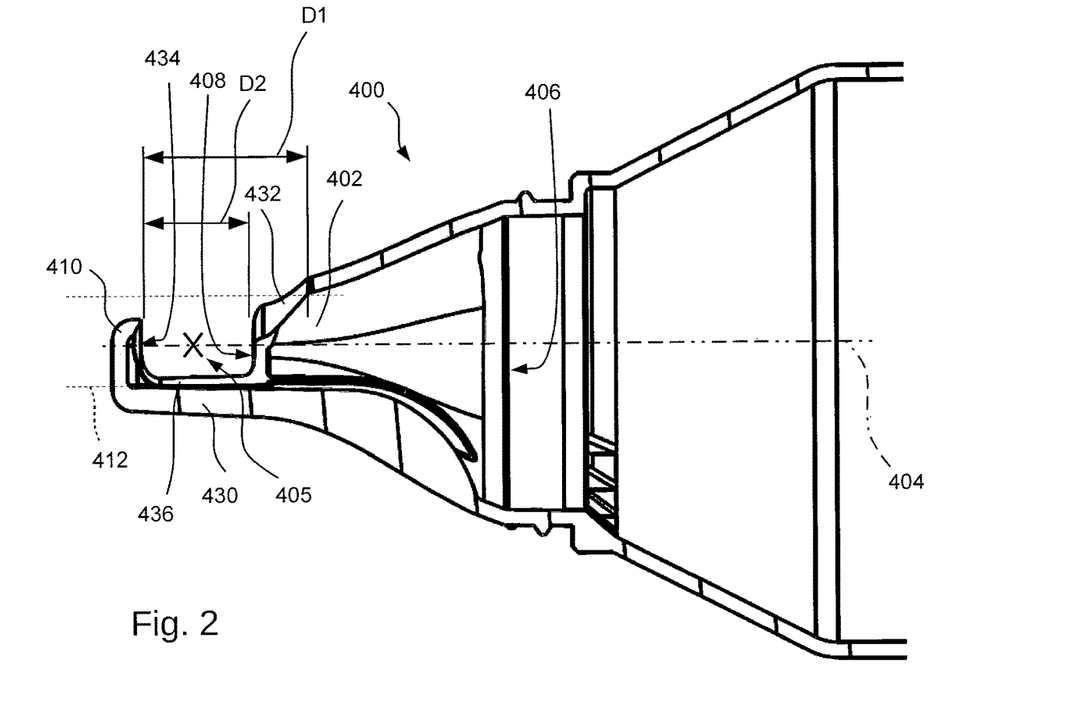
FIGS. 2 and 3 each depict a schematical section of the dispensing head.
Figure 3:
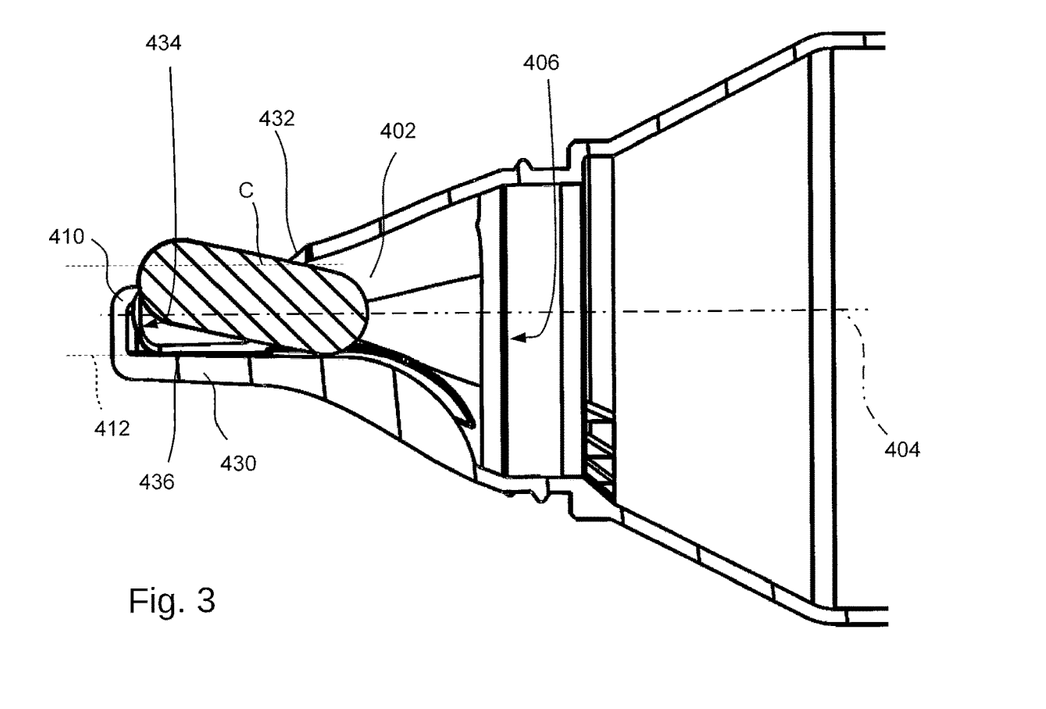
Figure 4A:
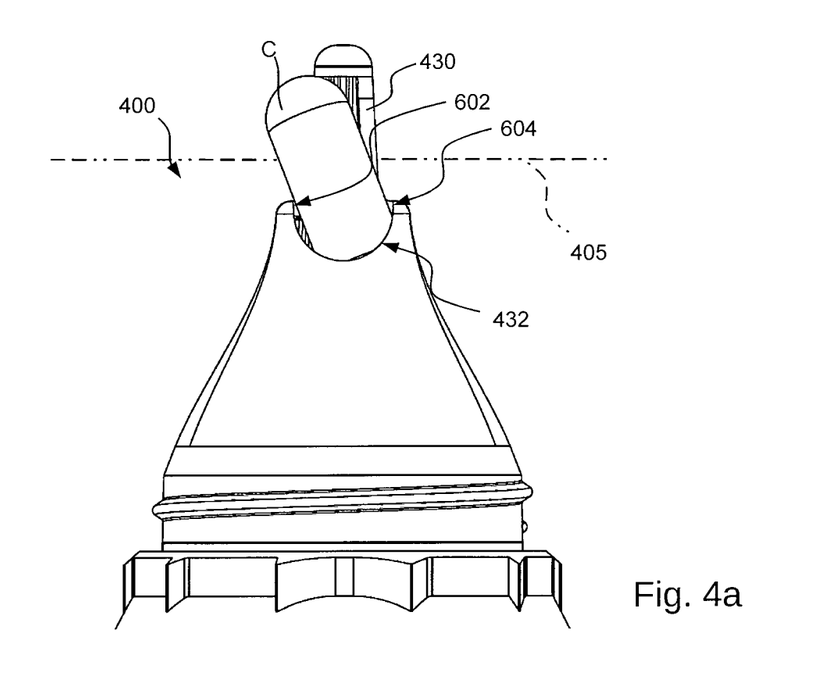
FIGS. 4a and 4b each depict the dispending head of FIGS. 1 to 3 in a perspective view.
Figure 4B:
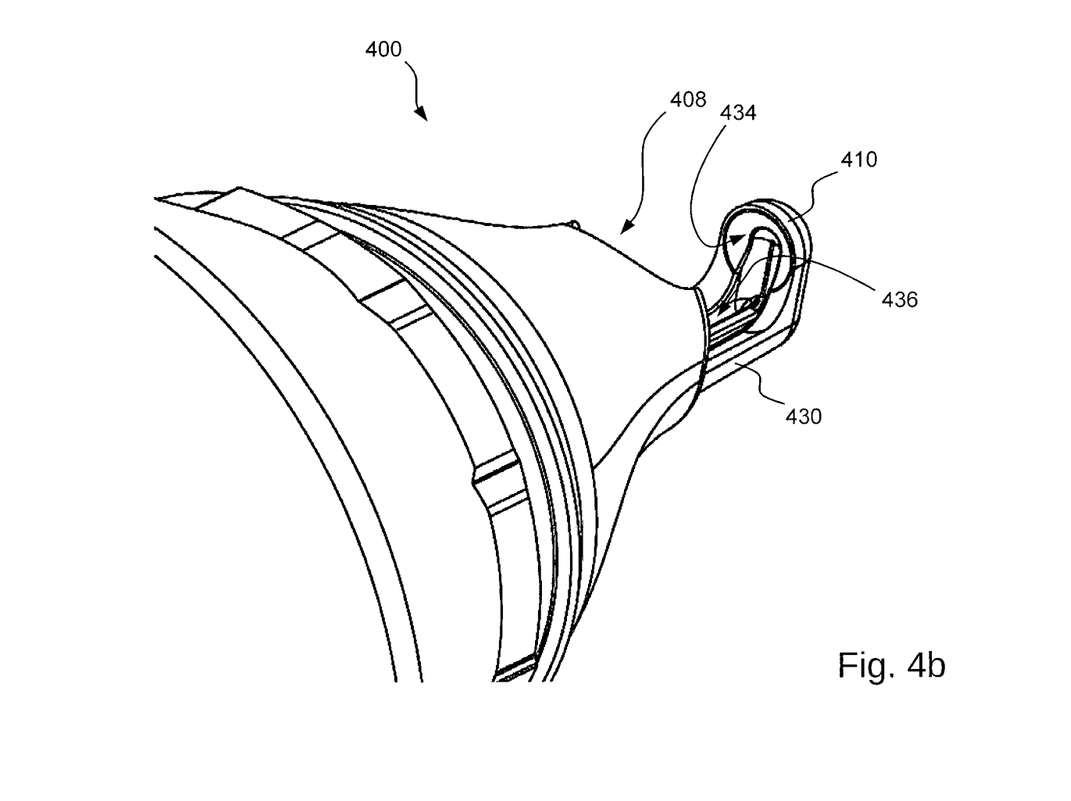
Figure 5:
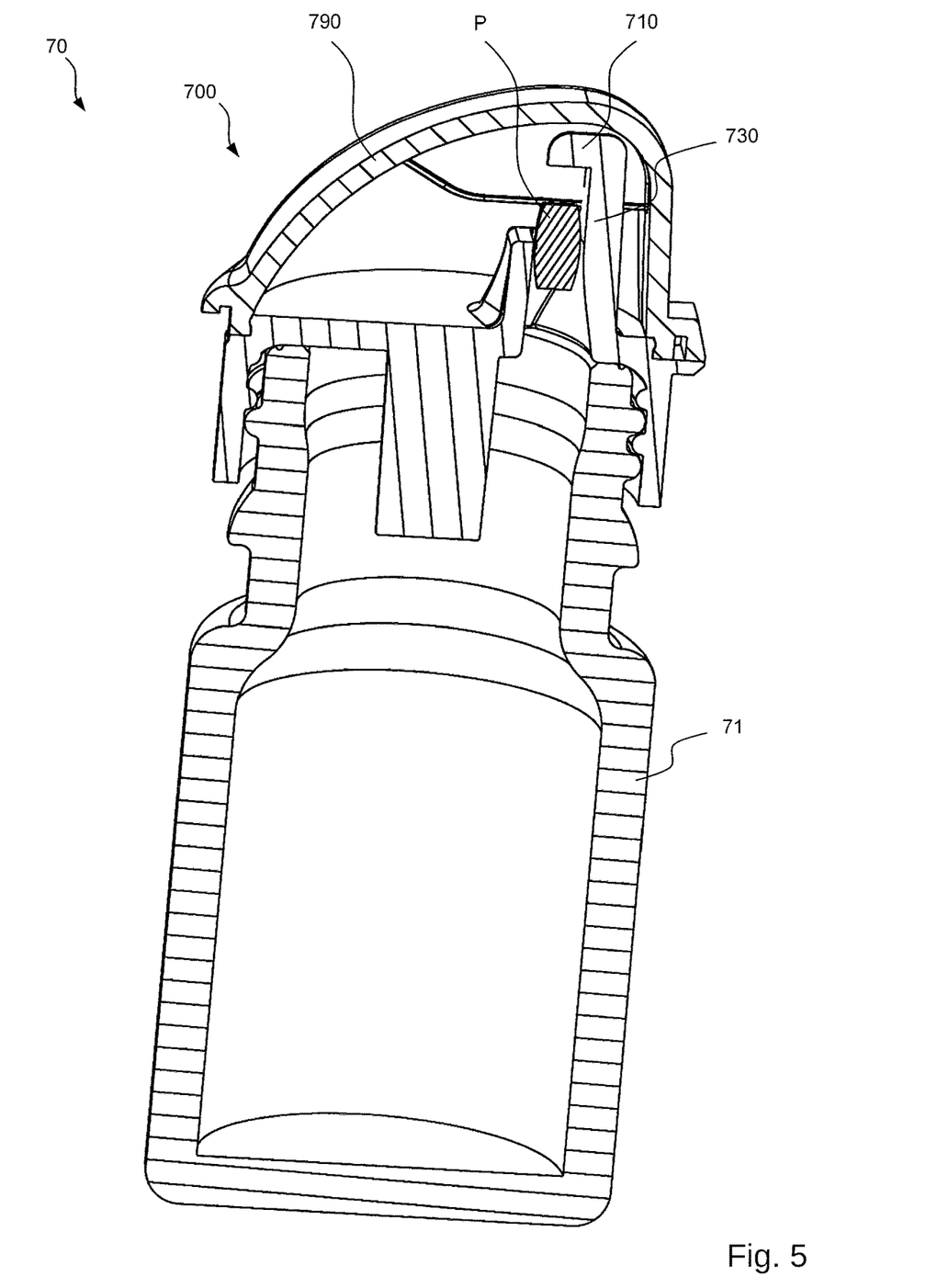

FIGS. 2 and 3 depict that the unit C in form of an elongated capsule for dispensing is longer than a distance D1 between the retention element 410 and the cutout 432. The distance D1 prevents the capsule from falling out of the pick-up area. A clearance D2 between the retention element 410 and the exit port 408 is smaller than the distance D1 and allows grasping the unit C with the user's fingers.

Two parallel walls 602, 604 extend from the support section 430 and delimit the exit port 408. The walls 602, 604 delimit corresponding edges. The walls 602, 604 limit a lateral movement of the unit C against the edges of the retention section 434.

A lid 490 comprises an inner locking section 492, which locks a pick-up area delimited by the retention section 410 and the support section 430.

An access axis 405 runs perpendicular to axis 404 and passes through two opposing, U-shaped access openings, each of which has a U-shape, over which the unit C to be dispensed projects, so that the unit can be removed with index finger and thumb. As can be seen in FIG. 2, two opposing, U-shaped access openings are provided by at least the support section 430, and in particular by the retention section 410 and by the outlet port 408.

The dosing axis 404 passes through the retention section 410. The retention element 410 extends from a distal end of the support section 430. The retention element 410 extends from the distal end of the support section 430 at least partly perpendicularly to the dosing axis 404. Therefore, the retention section 410 is configured to limit a movement of the unit C along the dosing axis 404.

FIGS. 5 to 9 refer to a second example of a dispenser head 700 for a dispenser 70. The dispenser 70 comprises the dispenser head 700 and the reservoir 71.

A dosing duct 702 extends along a dosing axis 704 and connects an inlet port 706 for receiving the unit P from the reservoir 71 with an outlet port 708 for dispensing the unit P. A support section 730 for the unit P extends from the exit port 708 parallel to the dosing axis 704. A retention section 710 extends from a distal end of the support section 730 at least partly perpendicularly to the dosing axis 704, wherein the retention section 710 is arranged distally to the outlet port 708, and wherein said retention section 710 extends into an imaginary continuation 712 of the dosing duct 702.

The support section 730 tapers towards the retention section 710. A clearance D2 between short sidewalls 780, 782 of the exit port 708 and the retention element 710 is smaller than a diameter of the disc-like unit P but greater than a half of the diameter of the disc-like unit P.

Figure 6:
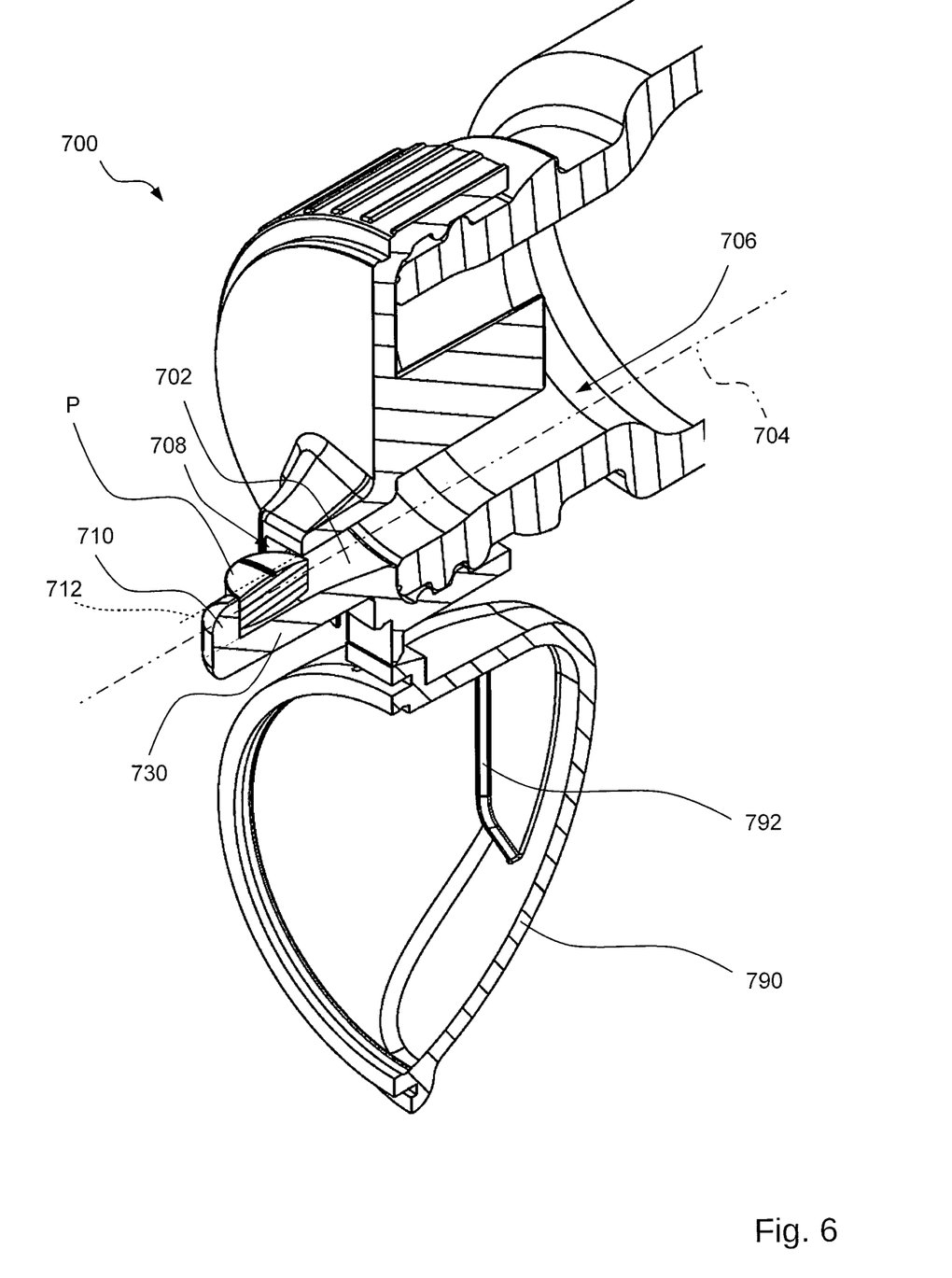
FIG. 6 depicts a schematical section of the example of the dispensing head of FIG. 5.
Figure 7:
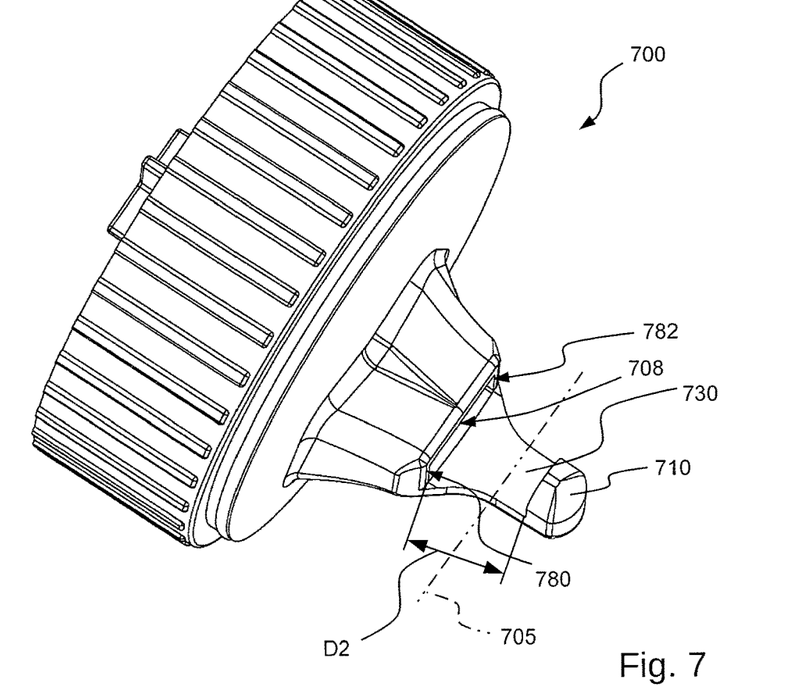
FIGS. 7 and 8 each depict the dispensing head of FIG. 5 in a perspective view.
Figure 8:
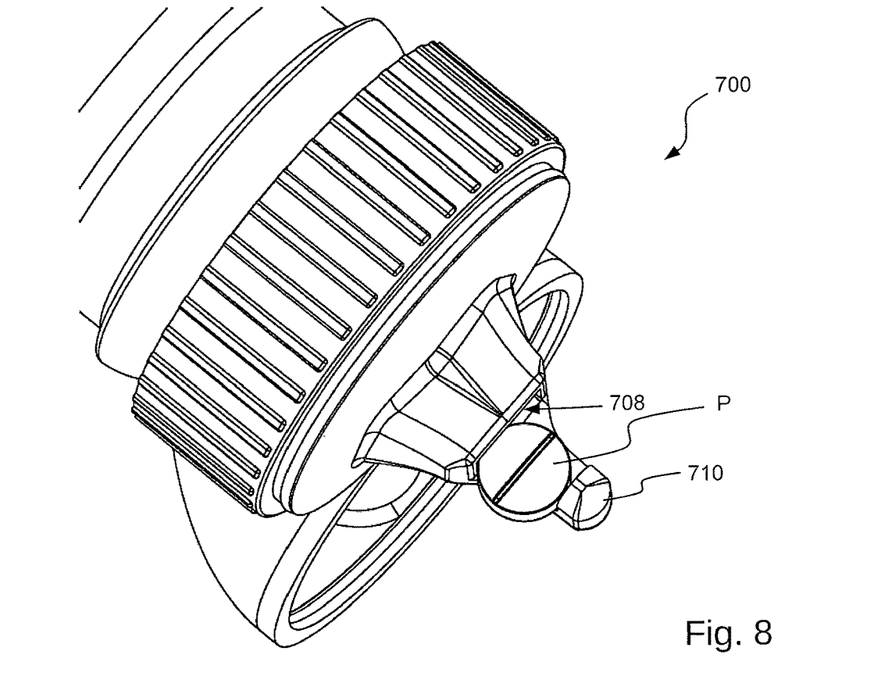

A lid 790, shown in FIG. 6, comprises at least one inner locking protrusion 792, which locks a pick-up area provided by the retention section 710 and the support section 730. The at least one locking protrusion 792 blocks the unit P from exiting the exit port 708 by entering a lateral area of the pick-up area.

Figure 9:
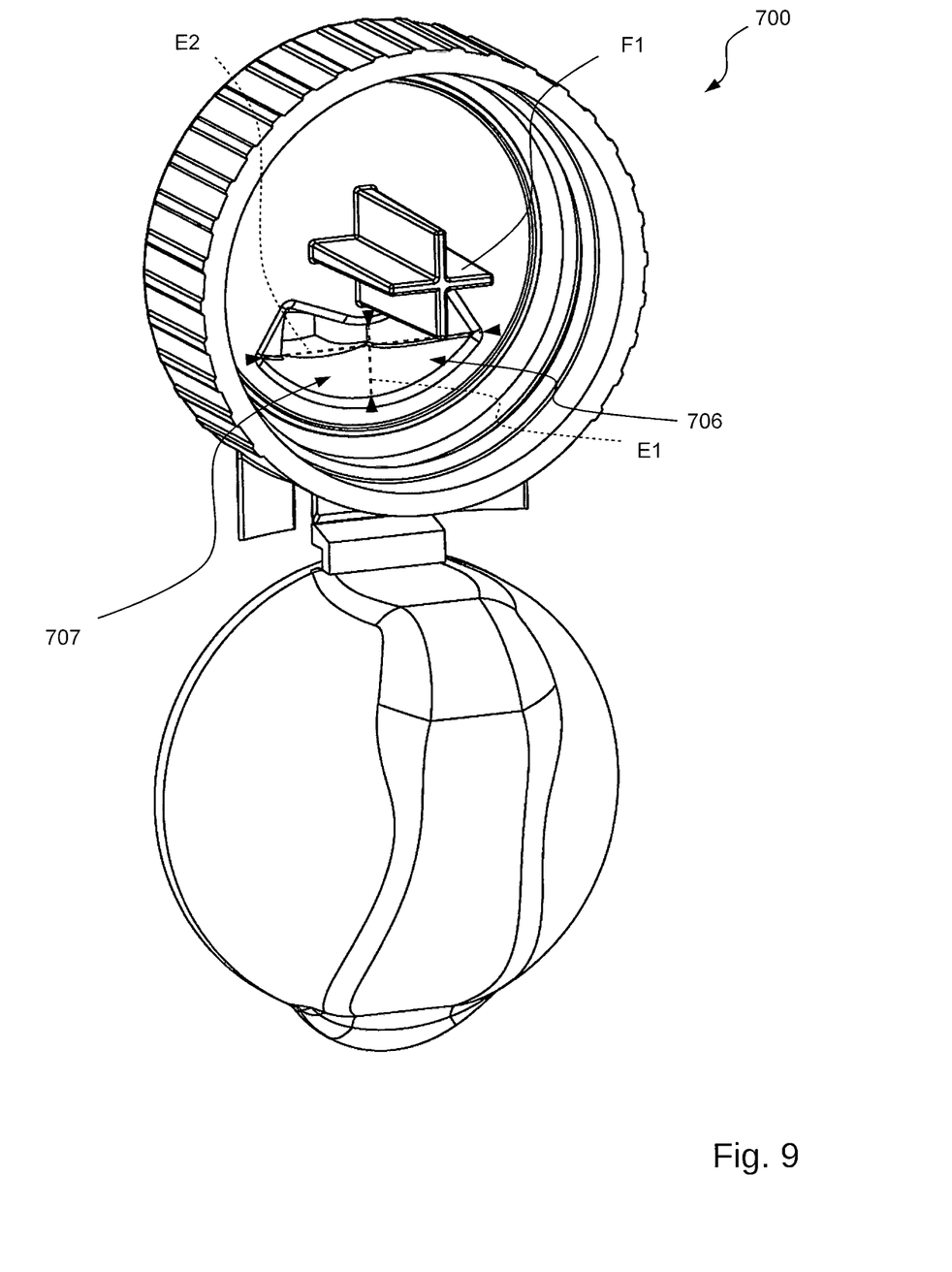
FIG. 9 depicts a back view of the dispensing head of FIG. 5.
Figure 10:
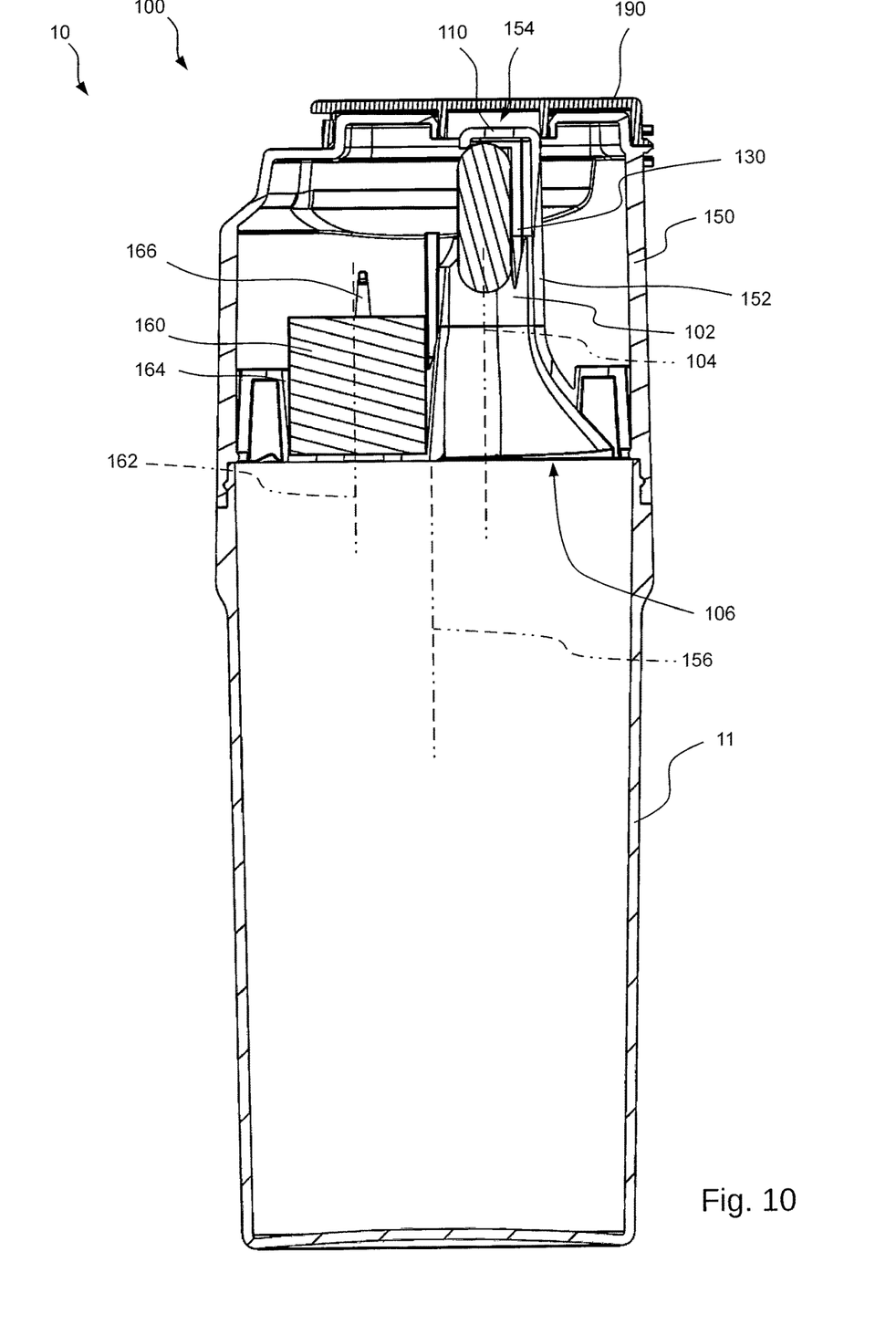

The inlet port 706, as shown in FIG. 9, has a first clearance or opening width E1, which is extends perpendicular to the support section 730. The first clearance E1 is greater than a height of the unit and less than twice the height. A second clearance or opening width E2 extends parallel to the support section 730. The second clearance E2 is greater than the diameter of the unit and less than twice the diameter. When referring to the height and diameter of the unit P, a cylindrical outer shape of the unit P is assumed. Therefore, the height of the unit P is a cylinder height and the diameter of the unit P is a cylinder diameter.

The inlet port 706 has a half-moon-like funnel shape. Therefore, the dosing duct 702 start half-moon-like shaped from the inlet port 706. The curved shape of the inlet port 706 is established by the long sides being bent in the same direction. The center cross-like stem F1 near the inlet port 706 inhibits a loos silica gel bullet from entering the dosing duct 702 allowing units P to stream inside the dosing duct 702 via the inlet port 706. Moreover, this shape enables the dosing duct 702 to receive and eject only one single unit C at the outlet port 708.

An access axis 705 runs perpendicular to the dosing axis 704 and passes through two opposing, U-shaped access openings, each of which has a U-shape, over which the unit P to be dispensed projects, so that the unit can be removed with index finger and thumb.

FIGS. 10 to 14 refer to a third example of a dispenser head 100 for a dispenser 10. The dispenser 10 comprises the dispenser head 100 and the reservoir 11.

A dosing duct 102 extends along a dosing axis 104 and connects an inlet port 106 for receiving the unit C from the reservoir 11 with an outlet port 108 for dispensing the unit C. A support section 130 for the unit C extends from the exit port 108 parallel to the dosing axis 104. A retention section 110 extends from a distal end of the support section 130 at least partly perpendicularly to the dosing axis 104, wherein the retention section 110 is arranged distally to the outlet port 108, and wherein said retention section 110 extends into an imaginary continuation 112 of the dosing duct 102.

The dispenser head 100 comprises an enclosing body 150 and a dosing body 152. The dosing body 152 comprises the dosing duct 102, the support section 130, and the retention section 110.

Figure 12:
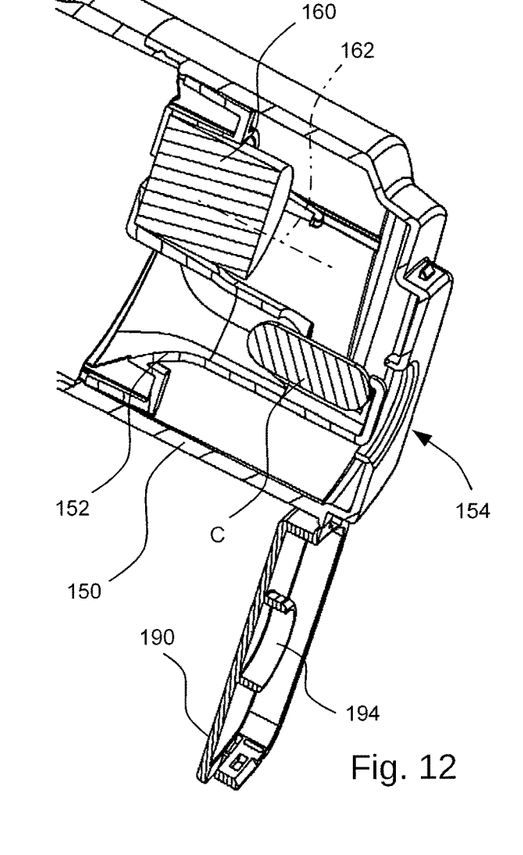
FIG. 12 a sectional view with the dosing body in its retracted position.
Figure 13:
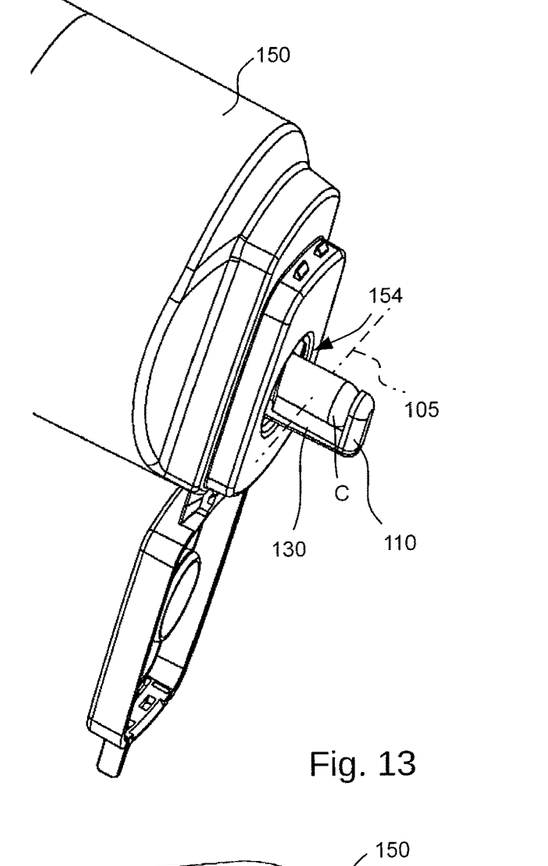
FIG. 13 a perspective view with the dosing body in its pick-up position.

The dosing body 152 is arranged inside the enclosing body 150 movably along an axis 156, which is parallel to the dosing axis 104, between a retracted position and a pick-up position.

The enclosing body 150 comprises a distal opening 154 through which the support section 130 and the retention section 110, which form a pick-up section, extend, if the dosing body 152 is in its pick-up position. A lid 190 closes the distal opening 154. The lid 190 comprises a closure section 194 configured to close the distal opening 154. When the flip-off lid 190 is in its closed position, the closure section 194, for example comprising an outer cylindrical surface, engages with the distal opening 154, for example, comprising an inner cylindrical surface. FIG. 12 shows the dosing body 152 in its retracted position. FIG. 13 shows the dosing body 152 in its pick-up position.

Figure 11:
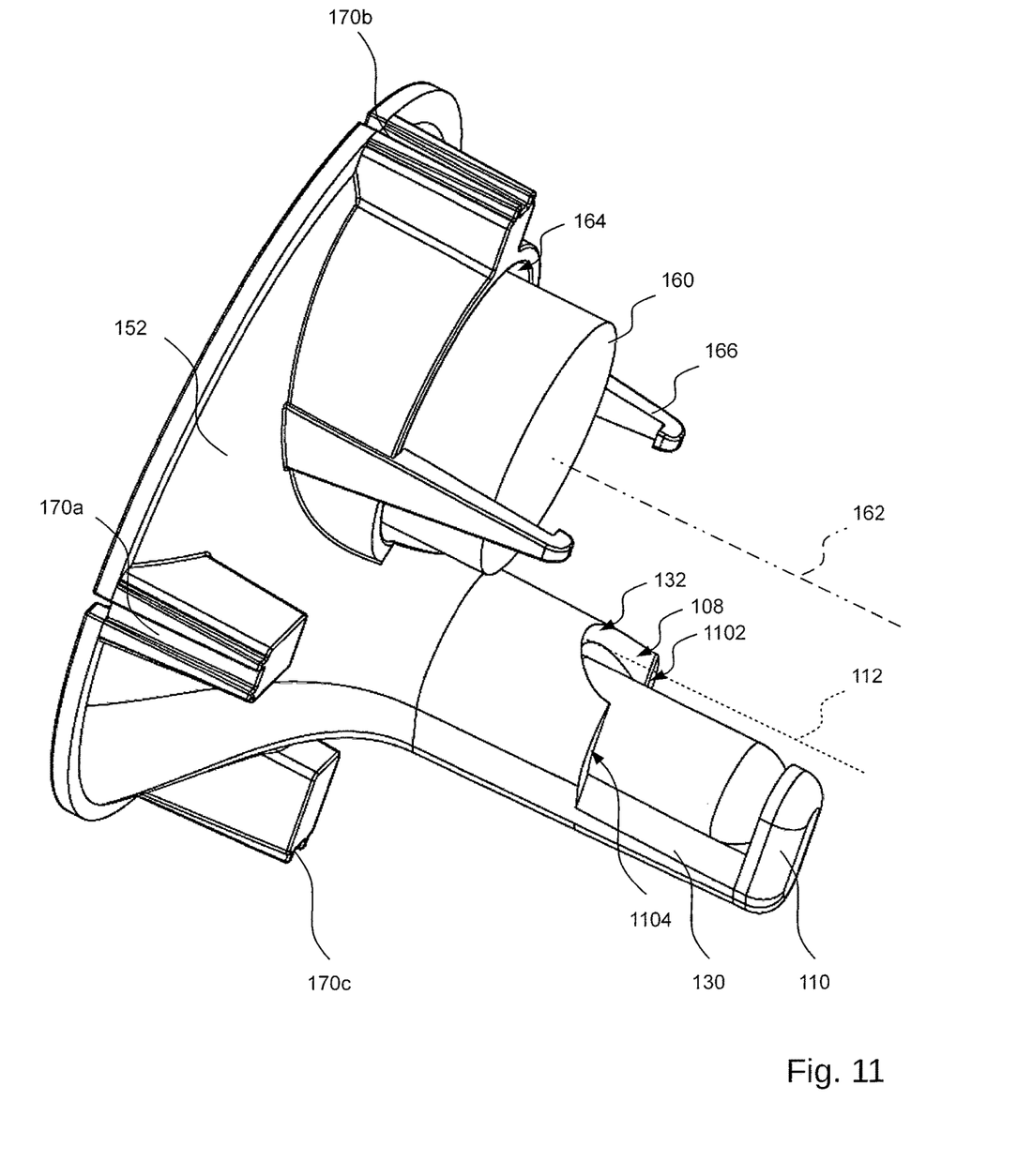
FIGS. 11, and 15 to 18 each a dosing body of the dispensing head.
Figure 14:
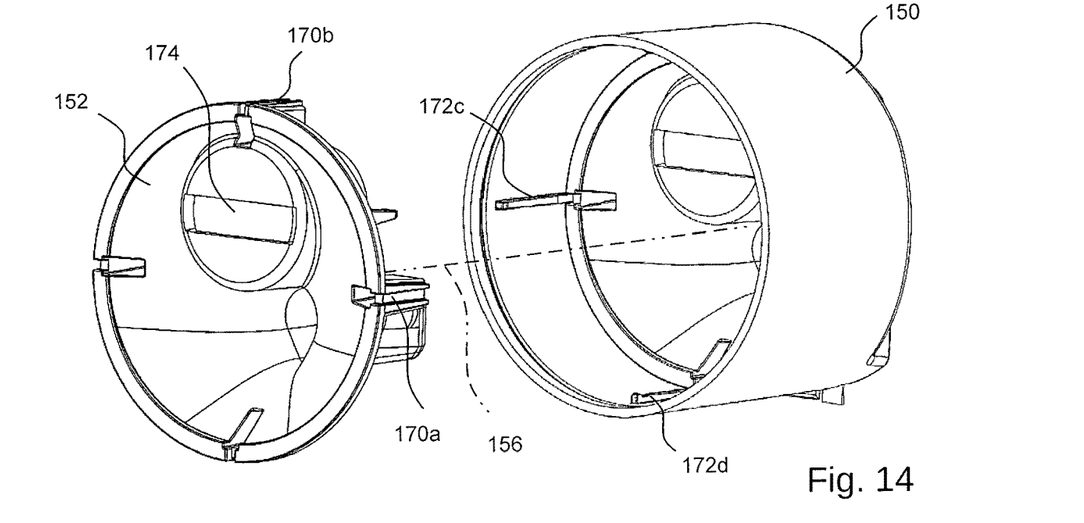
FIG. 14 the dosing body and an enclosing body.

The dispenser head 100 comprises an auxiliary weight body 160, which is for example cylindrically shaped and which is movably along an axis 162 parallel to the dosing axis 104 and movably attached to the dosing body 152. When the auxiliary weight body 160 moves and is stopped at a stopping area of the dosing body 152, the impact generated helps to move the dosing body 152 into the desired position. The auxiliary weight body 160 comprises a desiccant like silica gel for keeping the units being accommodated in the reservoir 11 dry during shelf life.

The auxiliary weight body 160 is received in a receiving section 164 of the dosing body 152. The receiving section 164 comprises a cylindrical inner wall and a base. As shown in FIG. 14, the base of the receiving section 164 comprises an opening 174 smaller than the dimensions of the unit C. The opening 174 allows that the desiccant of the auxiliary weight body 160 has a fluid connection to the reservoir 11.

At least one hook 166 secures the auxiliary weight body 160. The at least one hook 166 and the receiving section 164 represent guiding means for the auxiliary weight body 160.

Lateral longitudinal grooves 170a-d are arranged laterally on the dosing body 152. As shown in FIG. 14, each one of the longitudinal grooves 170a-d of the dosing body 152 engages in a corresponding one of longitudinal inner projections 172a-d of the enclosing body 150. Therefore, the grooves 170a-d and the projections 172a-d represent guiding means for the dosing body 152. The former guiding means allow that the dosing body 152 slides from its retracted position to the pick-up position and vice versa.

Figure 15:
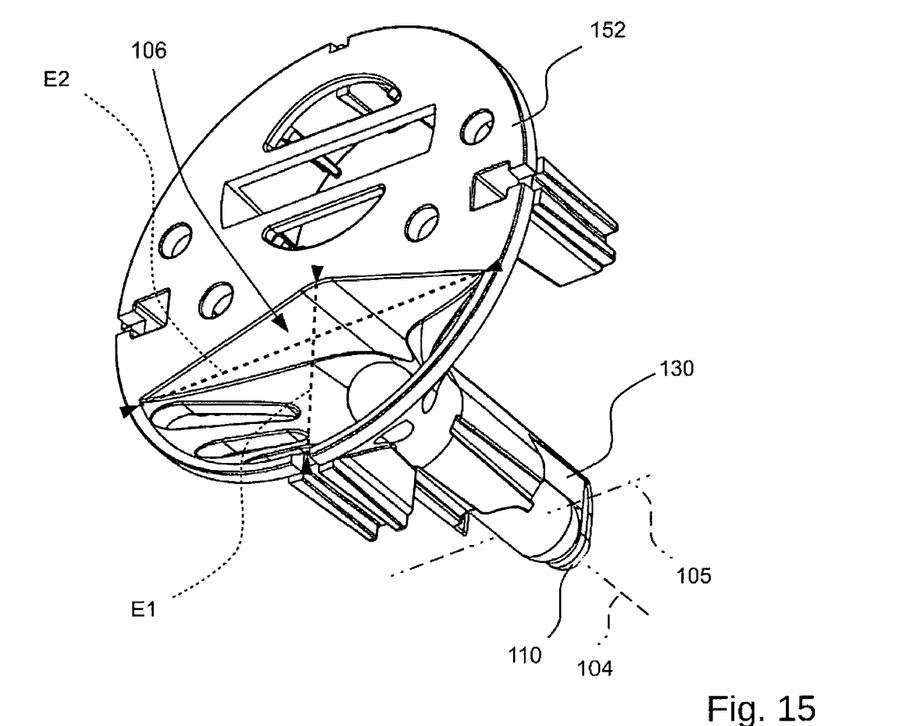

FIG. 15 depicts the dosing body 152 from the backside. The differences to the dosing body 152 of FIG. 11 comprise a) that the unit C has to be lifted in the other direction to remove it, and b) that the inlet port 106 is different from that shown in FIG. 14.

The inlet port 106 comprises the first opening width E1, which is perpendicular to the dosing axis 104 and is larger than the second opening width E2 of the inlet port. The second opening width E2 is arranged perpendicular to the dosing axis 104. The second opening width E2 is arranged perpendicular to the first opening width E1.

The two opposing, U-shaped access openings are provided by at least the support section 130, and in particular by the retention section 110 and by the outlet port 108. The access axis 205 runs through these access openings and is arranged perpendicularly to the dosing axis 104.

Figure 16:
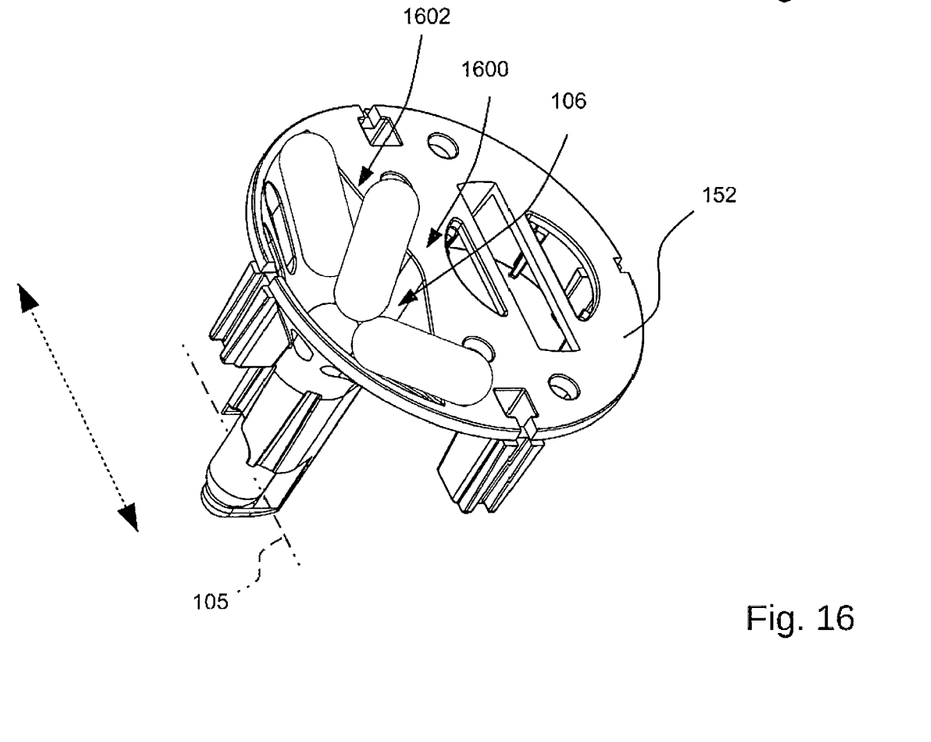

FIG. 16 illustrates a use of the dosing body 152 of the dispenser head 100. A longitudinal extension of the inlet port 106 is parallel to the access axis 105, which runs through the opposing access openings. The inlet port 106 is made up of an outward circular segment and an inward V-shaped segment that opens towards the center of the inlet port 106.

By shaking the dispenser bell-like and/or along the shown double-arrow, the shown capsules will be fed to the dosing duct 102 one after another. Advantageously, the capsules flow freely to the exit port. As the inlet port 106 is wider in the direction of the access axis 105 and narrower perpendicular to the access axis 105, the capsules create the greatest jamming force parallel to the access axis 105. Agitation along the access axis 105 disrupts this jamming effect and frees the capsules. The swinging action is both easy to do as manual action and is particularly effective to avoid a capsule jam. Moreover, the user will intuitively agitate the dispenser along the access axis 105, as the user will grasp the dispenser with his hand so that he can grasp the dispensed unit or capsule with his hand. This is why the former orientation of the inlet port is advantageous.

Between the inlet port 106 and a dam 1600 there is provided a sharp edge 1602 with at least one radius of curvature greater than 0.01 mm and less than 7 mm, in particular greater than 0.2 mm and less than 3 mm. The radius of curvature of the sharp edge is perpendicular to the path of the edge of the inlet port 106.

Figure 17:
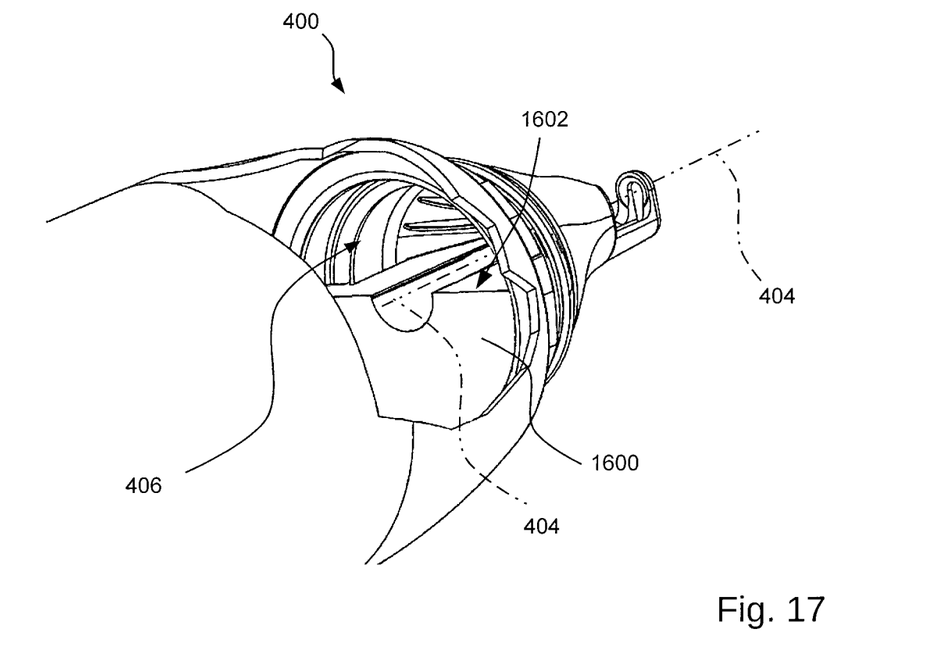
Figure 18:
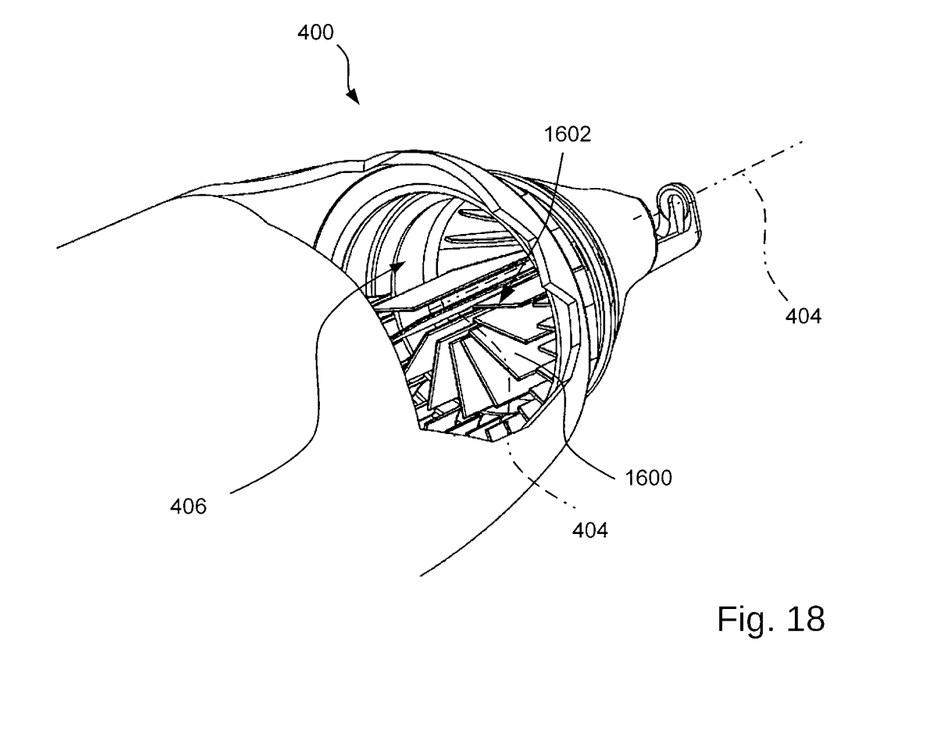

FIGS. 17 and 18 depict a respective variation of the dispenser head 400 of FIG. 2, for example. The dispenser head 400 of FIG. 17 comprises the inlet port 406 that comprises a circumferential sharp edge 1602 with at least one radius of curvature greater than 0.2 mm and less than 5 mm, in particular greater than 0.5 mm and less than 3 mm. The radius of curvature of the sharp edge 1602 is perpendicular to the path of the edge 1602 of the inlet port 406. The inlet port 406 is made up of an outward circular segment and an inward segment that has two sub-segments arranged perpendicularly to the dosing axis and a central half-circle-shaped sub-segment, which is arranged between the two sub-segments.

FIG. 18 particularly depicts that the sharp edge 1602 of the inlet port 406 can also be interrupted. This interruption is particularly advantageous if the sharp edge 1602 is constructed at least partly via several segments.

Figure 19:
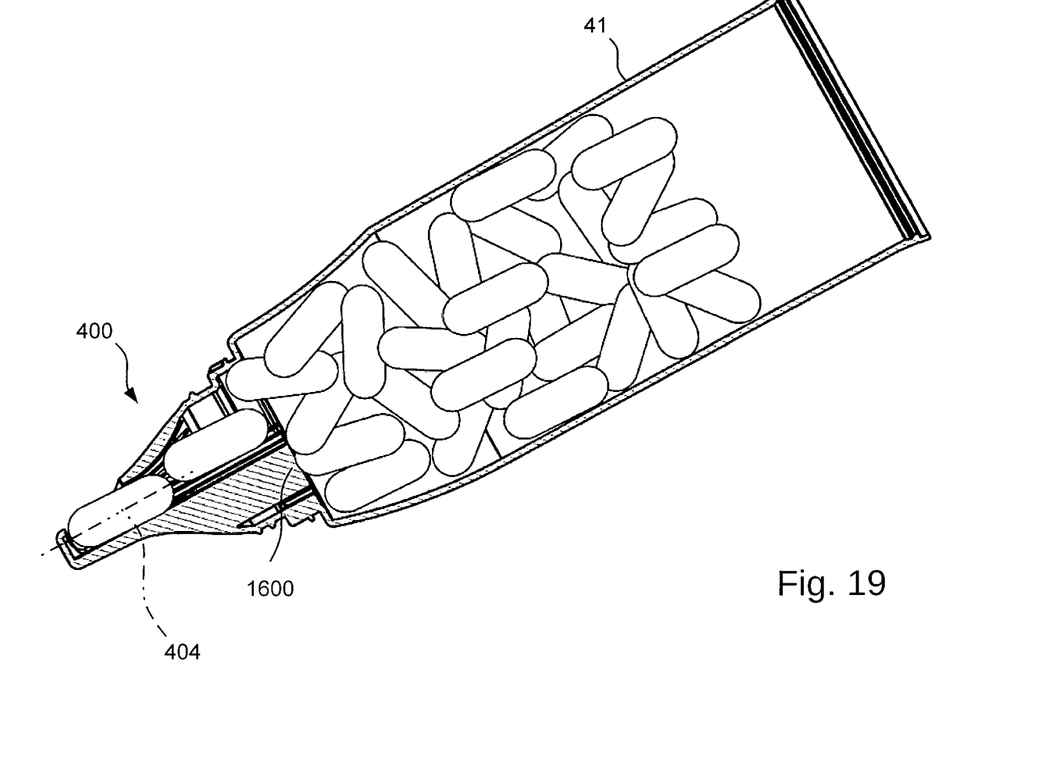
FIG. 19 depicts the dispenser with its head facing downward in a schematic cut.

FIG. 19 illustrates in a schematic cut through the dispenser what happens if the dispenser head 400 faces downwards. The capsules inside the container 41 do not jam the inner inlet port because the dam 1600 prevents the capsules from blocking each other inside the dosing duct. In particular, the dam 1600 provides a barrier for a part of the capsules. Due to the edge between the dam 1600 and the inlet port, the inlet port is confined so that the capsules can be dispensed without any jams.

The invention claimed is:

1. A dispenser head for dispensing a unit of a pharmaceutical drug or a food supplement or food, the dispenser head comprising:
 a dosing duct extending along a dosing axis and connecting an inlet port for receiving the unit from a reservoir with an outlet port for dispensing the unit;
 a support section for the unit, which extends from the outlet port parallel to the dosing axis;
 a retention section which extends from the support section; and
 two opposing, U-shaped access openings are provided by at least the support section, the retention section, and the outlet port so that the unit can be removed with an index finger and a thumb.

2. The dispenser head according to claim 1, wherein the outlet port is delimited by a cutout opening towards the retention section and opening facing away from the support section.

3. The dispenser head according to claim 2, wherein the support section comprises a recess facing the dosing axis.

4. The dispenser head according to claim 2, wherein the support section tapers towards the retention section.

5. The dispenser head according to claim 1, wherein a longitudinal extension of the inlet port is arranged parallel to an access axis, which runs through the two opposing, U-shaped access openings.

6. The dispenser head according to claim 2, wherein a first distance between the retention section and the cutout is smaller than a longitudinal extension of the unit.

7. The dispenser head according to claim 6, wherein a clearance between the retention section and the outlet port is smaller than the first distance.

8. The dispenser head according to claim 1, wherein two parallel walls that extend from the support section delimit the outlet port.

9. The dispenser head according to claim 1, wherein the retention section comprises a recess facing the outlet port.

10. The dispenser head according to claim 1, wherein a clearance between the outlet port and the retention section is smaller than a diameter of the unit.

11. The dispenser head according to claim 10, wherein the inlet port for receiving the unit from the reservoir comprises a first opening width, which is perpendicular to the dosing axis and is larger than a second opening width of the inlet port, wherein the second opening width is perpendicular to the dosing axis, and wherein the second opening width is perpendicular to the first opening width.

12. The dispenser head according to claim 11, wherein the first opening width of the opening is greater than a height of the unit and less than twice the height of the unit, and wherein the second opening width, perpendicular to the clearance and extending parallel to the support section, is greater than a diameter of the unit and less than twice the diameter.

13. The dispenser head according to claim 1, wherein the inlet port comprises a sharp edge.

14. The dispenser head according to claim 13, wherein the inlet port comprises the sharp edge, which is circumferential with at least one radius of curvature greater than 0.01 mm and less than 7 mm, wherein the radius of curvature is perpendicular to a path of the sharp edge.

15. The dispenser head according to claim 1, wherein the dispenser head comprises:
an enclosing body; and
a dosing body, which is arranged inside the enclosing body movably along an axis between a retracted position and a pick-up position, wherein the dosing body comprises the dosing duct, the support section, and the retention section.

16. The dispenser head according to claim 15, wherein the enclosing body comprises a distal opening through which the support section and the retention section extend when the dosing body is in the pick-up position.

17. The dispenser head according to claim 16, wherein the dispenser head comprises a lid with a closure section configured to close the distal opening.

18. The dispenser head according to claim 15, wherein the dispenser head comprises an auxiliary weight body, which is movably attached to the dosing body.

19. The dispenser head according to claim 18, wherein the auxiliary weight body comprises a desiccant.

20. The dispenser head according to claim 1, wherein the dosing axis passes through the retention section.

21. The dispenser head according to claim 1, wherein the retention section is configured to limit a movement of the unit along the dosing axis.

22. The dispenser head according to claim 1, wherein the retention section extends from a distal end of the support section.

23. The dispenser head according to claim 22, wherein the retention section extends from the distal end of the support section at least partly perpendicularly to the dosing axis.

24. A dispenser for dispensing the unit of the pharmaceutical drug or the food supplement or food, wherein the dispenser comprises the dispenser head according to claim 1, and the reservoir for storing a plurality of units.

\* \* \* \* \*